(12) United States Patent
Lee et al.

(10) Patent No.: US 10,725,597 B2
(45) Date of Patent: Jul. 28, 2020

(54) HOVERING AND TOUCH SENSING APPARATUS WITH ENHANCED SENSITIVITY

(71) Applicant: SUPERC-TOUCH CORPORATION, New Taipei (TW)

(72) Inventors: Hsiang-Yu Lee, New Taipei (TW); Shang Chin, New Taipei (TW); Ping-Tsun Lin, New Taipei (TW); Chia-Hsun Tu, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 137 days.

(21) Appl. No.: 16/042,856

(22) Filed: Jul. 23, 2018

(65) Prior Publication Data
US 2020/0026373 A1    Jan. 23, 2020

(51) Int. Cl.
*G06F 3/044*    (2006.01)

(52) U.S. Cl.
CPC .... *G06F 3/044* (2013.01); *G06F 2203/04107* (2013.01); *G06F 2203/04108* (2013.01)

(58) Field of Classification Search
CPC ...................................................... G06F 3/044
See application file for complete search history.

(56) References Cited

U.S. PATENT DOCUMENTS

| | | | | |
|---|---|---|---|---|
| 2014/0062937 A1* | 3/2014 | Schwartz | .............. | G06F 3/0418 345/174 |
| 2015/0091849 A1* | 4/2015 | Ludden | ................. | G06F 3/0412 345/174 |
| 2016/0179251 A1* | 6/2016 | Lee | ......................... | G06F 3/044 345/174 |
| 2016/0310992 A1* | 10/2016 | Van Rens | ............. | B06B 1/0292 |
| 2018/0292930 A1* | 10/2018 | Lee | ......................... | G06F 3/0416 |
| 2018/0321762 A1* | 11/2018 | Lee | ......................... | G06F 3/044 |
| 2018/0321778 A1* | 11/2018 | Lee | ......................... | G06F 3/0412 |

* cited by examiner

*Primary Examiner* — William Boddie
*Assistant Examiner* — Andrew B Schnirel
(74) *Attorney, Agent, or Firm* — Muncy, Geissler, Olds & Lowe, P.C.

(57) ABSTRACT

A hovering and touch sensing apparatus includes a plurality of touch sensing electrodes, a system circuit and a touch control circuit. When an operating object approaches to or touches the touch sensing electrodes for hovering or touch sensing operation, there is no common circuit loop between the system circuit and the touch control circuit to prevent the influence of the system circuit to the touch-sensing circuit. Besides, the touch control circuit sends a capacitance-exciting signal to the operating object through a first specific conductor of the system circuit, thus more effectively send the capacitance-exciting signal to the operating object and enhance the preciseness for sensing the touch sensing signal.

13 Claims, 13 Drawing Sheets

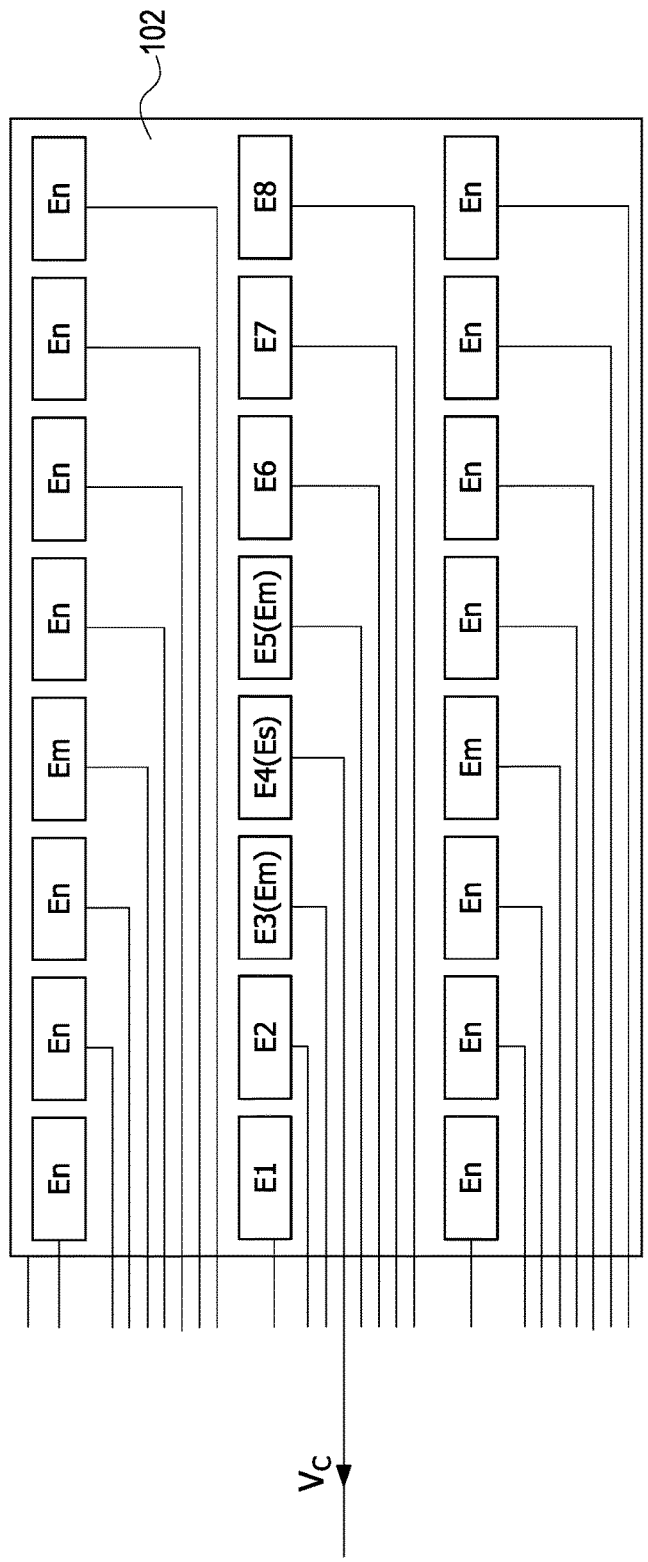
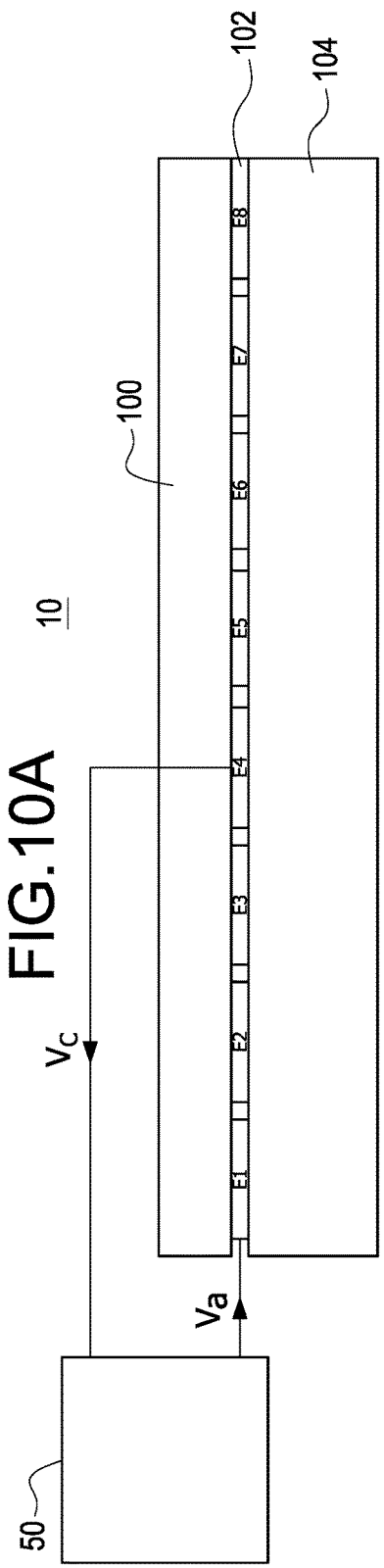
FIG.10A
FIG.10B

10

| 300 |
| 400 |
| 200 |

| 100 |
| 102 |

| 100 |
| 102 |
| 1031 |
| 1015 |

| 100 |
| 102 |
| 1031 |
| 1015 |
| 1032 |
| 1052 |

FIG.12D

HOVERING AND TOUCH SENSING APPARATUS WITH ENHANCED SENSITIVITY

BACKGROUND OF THE INVENTION

Field of the Invention

The present invention relates to a sensing apparatus, especially to a hovering and touch sensing apparatus with enhanced sensitivity.

Description of Prior Art

The popularity of the mobile electronic devices boosts the development of touch control technologies. The mutual interference between the display circuit and the touch control circuit in panel display is import issue as the touch control panel become thinner and more compact. Moreover, the mobile electronic devices may have demand for 3D gesture touch control in the near future. Therefore, the signal to noise ratio of capacitance measurement is desirably to enhance to increase the measurement distance between stylus (user finger) and mobile electronic device. There is still much room for improvement for touch control devices.

SUMMARY OF THE INVENTION

It is an object of the present invention to provide a hovering and touch sensing apparatus with enhanced sensitivity.

Accordingly, the present invention provides a hovering and touch sensing apparatus, comprising a touch sensing electrode matrix comprising a plurality of touch sensing electrodes, a system circuit and a touch control circuit;

the system circuit comprising: a system power source; a system ground; a first specific conductor electrically connected to the system power source and the system ground;

the touch control circuit comprising: a touch control power source; a touch control ground; a capacitance-exciting signal source; a capacitance-exciting signal driver circuit; and at least one capacitance-sensing signal receiving circuit, wherein the touch control power source is electrically connected to the touch control ground and supplies electric power to the capacitance-exciting signal source, the capacitance-exciting signal driver circuit, and the at least one capacitance-sensing signal receiving circuit, wherein when an operation object approaches or touches the plurality of touch sensing electrodes for hovering or touch sensing operation, there is no common current loop between the system power source and the touch control power source; the capacitance-exciting signal source generates an alternating signal; the capacitance-exciting signal driver circuit processes the alternating signal and then electrically coupled the processed alternating signal to the first specific conductor, wherein a first capacitor is formed between the operation object and the first specific conductor, a second capacitor is formed between the operation object and the respective one of the touch sensing electrodes, the at least one capacitance-sensing signal receiving circuit receives a touch sensing signal from a selected touch sensing electrode.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

FIG. 10A is a top view showing the touch sensing electrode layer of the hovering and touch sensing apparatus according to an embodiment of the present invention.

FIG. 10B is a schematic view showing the signals applied to the hovering and touch sensing apparatus during hovering or touch sensing operations.

FIG. 12A shows a layered structure of the hovering and touch sensing apparatus according to an embodiment of the present invention.

FIG. 12B shows the layered structures for the touch control panel according to an embodiment of the present invention.

FIG. 12C shows the layered structures for the touch control panel according to another embodiment of the present invention.

FIG. 12D shows the layered structures for the touch control panel according to still another embodiment of the present invention.

DETAILED DESCRIPTION OF THE INVENTION

Figure 9:
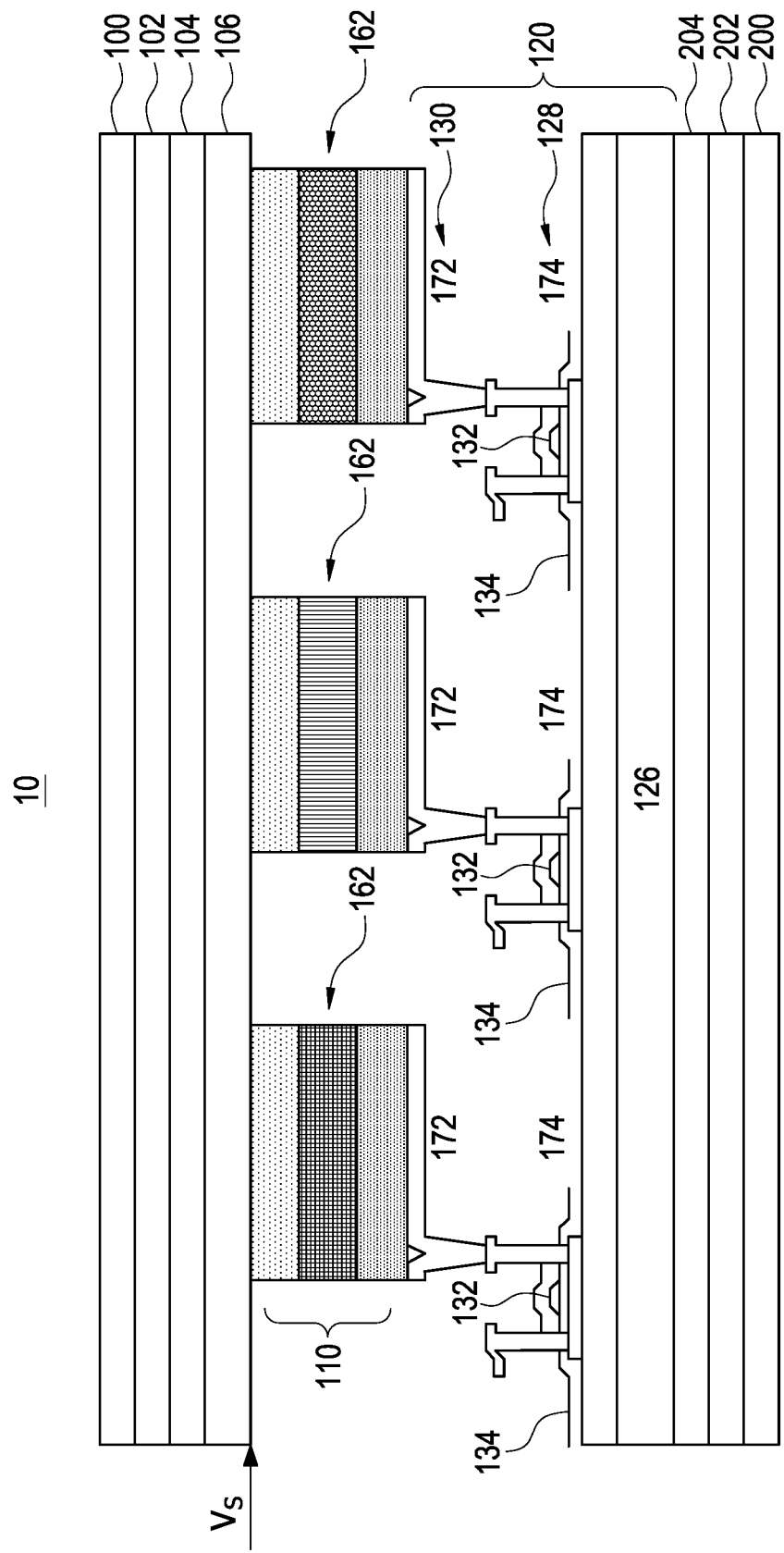
FIG. 9 is a sectional view showing the hovering and touch sensing apparatus according to one embodiment of the present invention.

FIG. 9 is a sectional view showing the hovering and touch sensing apparatus 10 according to one embodiment of the present invention. The hovering and touch sensing apparatus 10 comprises, from top to bottom, a protection layer 100, a touch sensing electrode layer 102, an encapsulation layer 104, a common electrode layer 106, an organic light emitting material layer 110, a thin film transistor (TFT) substrate 120, a shielding protective layer 204, a circuit layer 202 and a metallic casing 200 (or a conductive coating 200' of a casing). Besides, the TFT substrate 120 further comprises a pixel electrode layer 130, a TFT layer 128 and a transistor substrate 126. The organic light emitting material layer 110 comprises a plurality of organic light emitting materials 162. The organic light emitting materials 162 shown in FIG. 9 may emit light with different colors, for example, red color, green color and blue color. However, according to another embodiment, the organic light emitting materials 162 shown in FIG. 9 may also emit light with the same color. Besides, the display circuit corresponding to the embodiment shown in FIG. 9 is organic light emitting display circuit. However, according to the present invention, the display circuit may also be liquid crystal display circuit or micro LED display circuit.

With reference also to FIG. 9, the pixel electrode layer 130 comprises a plurality of pixel electrodes 172 and the TFT layer 128 comprises a plurality of thin film transistors 174, where the pixel electrodes 172 are respectively corresponding to the thin film transistors 174. The electric polarity of the pixel electrodes 172 is opposite to the electric polarity of common electrode layer 106. For example, the common electrode layer 106 is cathode when the pixel electrodes 172 are anodes; the common electrode layer 106 is anode when the pixel electrodes 172 are cathodes. The thin film transistors 174 are arranged on the transistor substrate 126. The transistor substrate 126 further comprises a plurality of gate lines 132 and a plurality of data lines 134, where the gate lines 132 and the data lines 134 are respectively connected to the gates and sources (drains) of the corresponding thin film transistors 174. Moreover, the embodiment shown in FIG. 9 is corresponding to the hovering and touch sensing apparatus 10 applying to the electronic system with organic light emitting display device. However, the hovering and touch sensing apparatus 10 of the present invention may also apply to the electronic system with other kinds of display devices, so the organic light emitting material layer 110 and the TFT substrate 120 may also have corresponding modification or replacement. Therefore, the detailed structure shown in FIG. 9 is not limitation to the present invention. As shown in FIG. 9, if an operation object (such as user finger or stylus) approaches or touches the touch sensing electrodes of the touch sensing electrode layer 102 for hovering or touch control operation, a capacitance-exciting signal Vs is applied to a larger conductor (larger than one of the touch sensing electrodes of the touch sensing electrode layer 102). The larger conductor is for example, the common electrode layer 106 shown in FIG. 9 such that the capacitance-exciting signal Vs is more effectively applied to the operation object to enhance the measurement sensibility and signal to noise ratio. Besides, for the sake of description convenience, in above description, the operation object (such as user finger or stylus) is described to approach or touch the touch sensing electrodes of the touch sensing electrode layer 102. However, in actual operation, with reference also to FIG. 9, the operation object may touch the insulating protection layer 100 and the statics on the operation object are transmitted to the touch sensing electrode layer 102 through the protection layer 100. In terms of touch control, the operation object equivalently "touches" the touch sensing electrode layer 102 for touch control operation. Besides, if the operation object is close to (approaches) the hovering and touch sensing apparatus 10 according to the present invention but is not in contact with the hovering and touch sensing apparatus 10, equivalent capacitor with larger capacitance can be formed between the common electrode layer 106 and the operation object because the common electrode layer 106 has larger area. Therefore, the capacitance-exciting signal Vs is more effectively applied to the operation object. The operation object has prominent static change and the touch sensing electrodes of the touch sensing electrode layer 102 may more effectively sense the signals corresponding to the static change. Therefore, the hovering and touch sensing apparatus 10 according to the present invention can also precisely determine whether an operation object is close to (approaches) thereto for hovering sensing operation.

Figure 11:
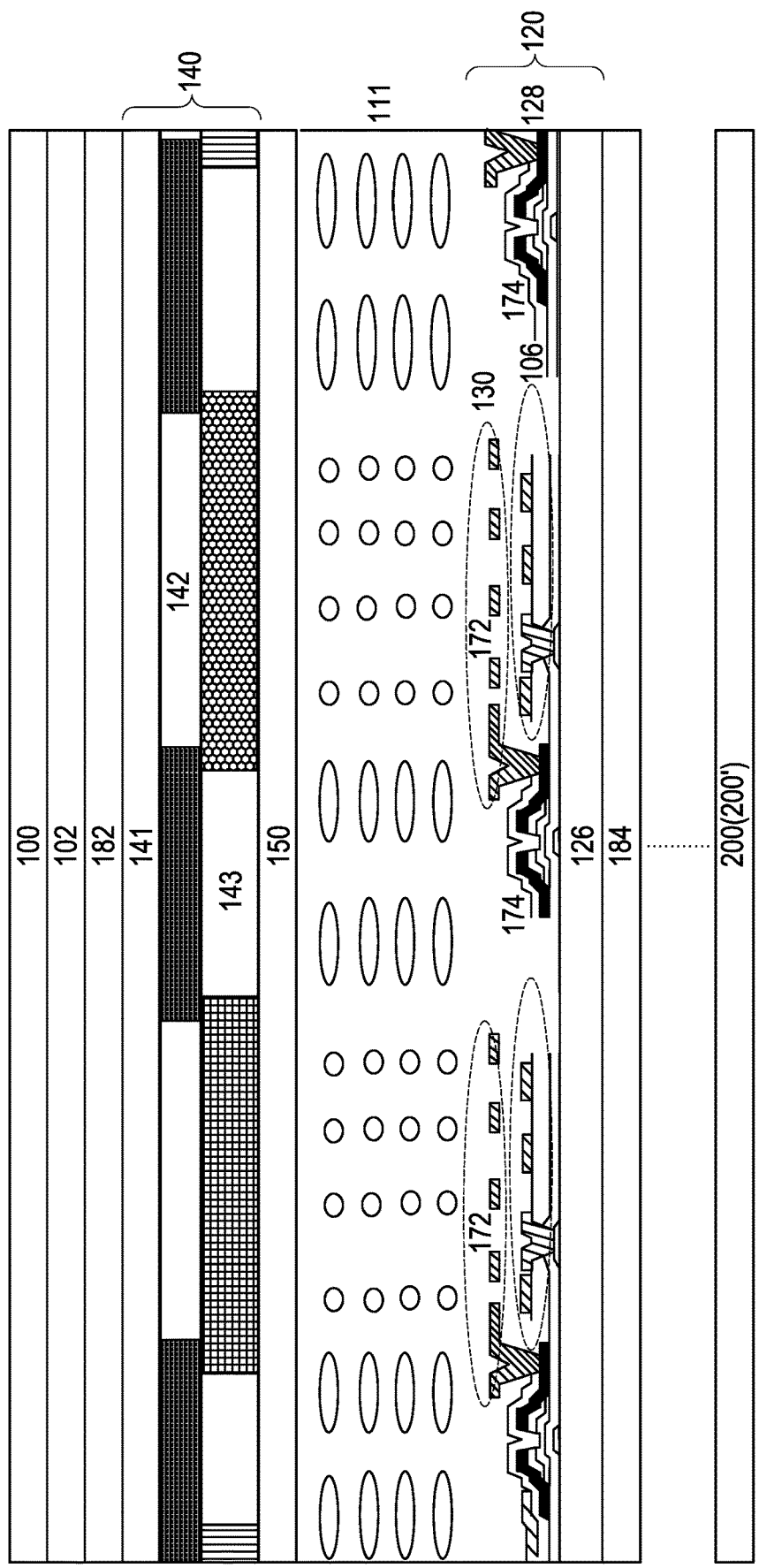
FIG. 11 is a sectional view showing the hovering and touch sensing apparatus 10 according to another embodiment of the present invention.

FIG. 11 is a sectional view showing the hovering and touch sensing apparatus 10 according to another embodiment of the present invention. The hovering and touch sensing apparatus 10 comprises, from top to bottom, a protection layer 100, a touch sensing electrode layer 102, an upper polarizer layer 182, a color filter plate 140, a static shielding protective layer 150, a liquid crystal material layer 111, a TFT substrate 120, a lower polarizer layer 184, and a metallic casing 200 (or a conductive coating 200' of a casing). Besides, the TFT substrate 120 further comprises a pixel electrode layer 130, a common electrode layer 106, a TFT layer 128 and a transistor substrate 126. The color filter plate 140 comprises a color filter (CF) substrate 141, a black matrix layer 142 and a color filter layer 143.

With reference also to FIG. 11, the pixel electrode layer 130 comprises a plurality of pixel electrodes 172 and the TFT layer 128 comprises a plurality of thin film transistors 174, where the pixel electrodes 172 are respectively corresponding to the thin film transistors 174. With reference also to FIG. 11, if an operation object (such as user finger or stylus) approaches or touches the touch sensing electrodes of the touch sensing electrode layer 102 for touch control operation, a capacitance-exciting signal Vs is applied to a larger conductor (larger than one of the touch sensing electrodes of the touch sensing electrode layer 102). The larger conductor is for example, the static shielding protective layer 150 shown in FIG. 11 such that the capacitance-exciting signal Vs is more effectively applied to the operation object to enhance the measurement sensibility and signal to noise ratio. Besides, for the sake of description convenience, in above description, the operation object (such as user finger or stylus) is described to approach or touch the touch sensing electrodes of the touch sensing electrode layer 102. However, in actual operation, with reference also to FIG. 11, the operation object may touch the insulating protection layer 100 and the static on the operation object is transmitted to the touch sensing electrode layer 102 through the protection layer 100. In terms of touch control, the operation object equivalently "touches" the touch sensing electrode layer 102 for touch control operation. Besides, if the operation object is close to (approaches) the hovering and touch sensing apparatus 10 according to the present invention but is not in contact with the hovering and touch sensing apparatus 10, an equivalent capacitor with larger capacitance can be formed between the static shielding protective layer 150 and the operation object because the static shielding protective layer 150 has larger area. Therefore, the capacitance-exciting signal Vs is more effectively applied to the operation object and the operation object has prominent static change. The touch sensing electrodes of the touch sensing electrode layer 102 may more effectively sense the signals corresponding to the static change. Therefore, the hovering and touch sensing apparatus 10 according to the present invention can also precisely determine whether an operation object is close to (approaches) thereto for hovering sensing operation.

FIG. 10A is a top view showing the touch sensing electrode layer 102 of the hovering and touch sensing apparatus 10 according to an embodiment of the present invention. FIG. 10B is a schematic view showing the signals applied to the hovering and touch sensing apparatus 10 during hovering or touch sensing operations. As shown in FIG. 10A, the touch sensing electrode layer 102 of the hovering and touch sensing apparatus 10 has a touch sensing electrode array, where the touch sensing electrode array comprises a plurality of touch sensing electrodes En arranged in array fashion. For the sake of description convenience, the touch sensing electrodes shown in FIG. 10B are labeled with symbols E1~E8, and FIG. 10B only shows part of the touch sensing electrodes in sectional view. Besides, for the sake of following description, the touch sensing electrode E4 is also referred to as the selected touch sensing electrode Es and the touch sensing electrodes surrounding the selected touch sensing electrode Es are referred to as the surrounding touch sensing electrodes Em. With reference back to FIG. 10B, when performing hovering or touch sensing operations to the hovering and touch sensing apparatus 10, a touch control circuit 50 sends a capacitance-exciting signal to a first specific conductor (with reference to FIG. 9, the first specific conductor may be the common electrode layer 106) and then receives (reads) a touch sensing signal Vc from the selected touch sensing electrode E4 (Es). Besides, the touch control circuit 50 optionally sends an auxiliary signal Va to the surrounding touch sensing electrodes Em, this will be detailed later.

Figure 1:
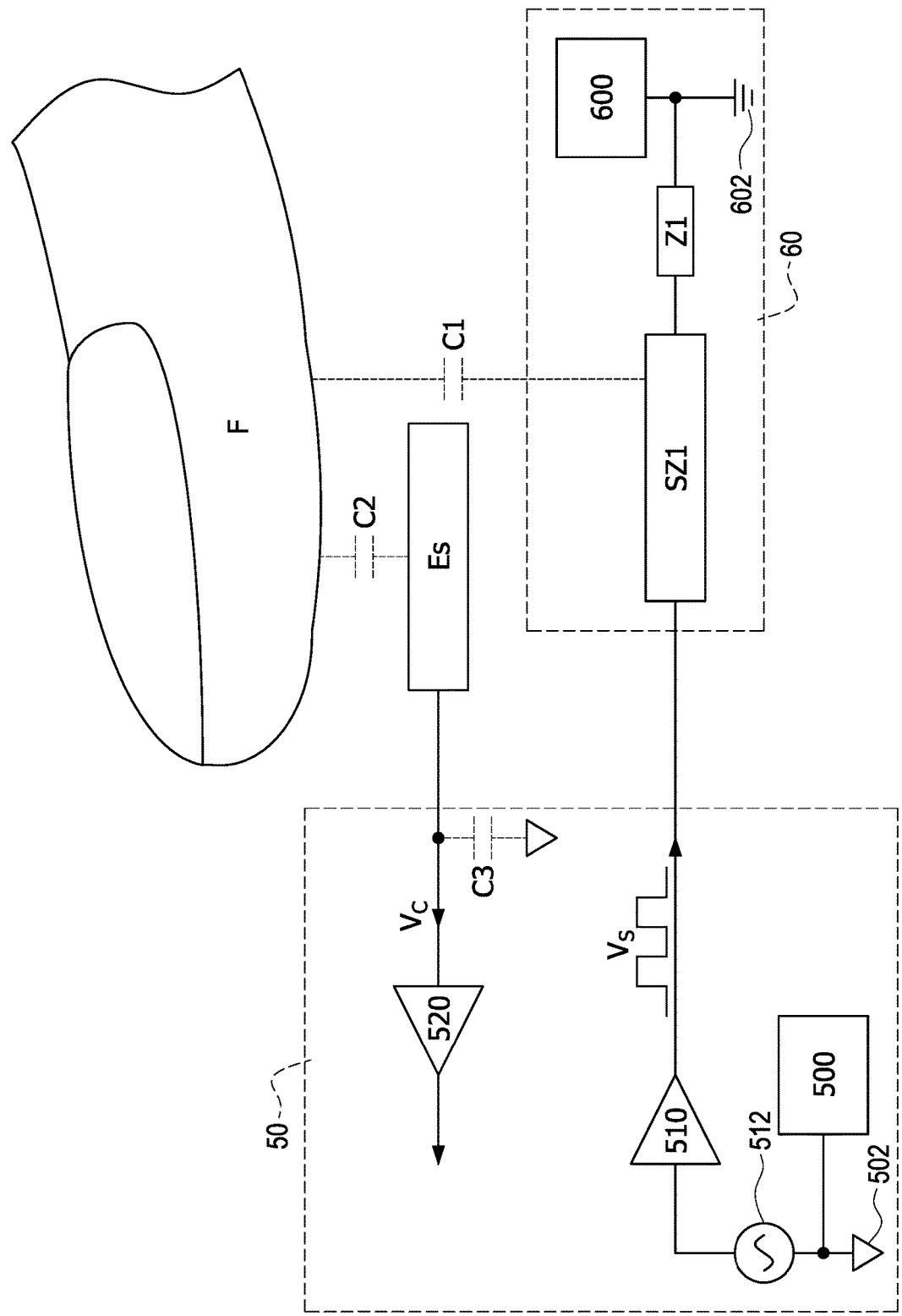
FIG. 1 shows a block diagram of the hovering and touch sensing apparatus according to an embodiment of the present invention.

FIG. 1 shows a block diagram of the hovering and touch sensing apparatus 10 according to an embodiment of the present invention. As shown in this figure, the hovering and touch sensing apparatus 10 of the present invention further comprises a touch control circuit 50 and a system circuit 60. The touch control circuit 50 comprises a touch control power source 500, a touch control ground 502, a capacitance-exciting signal driver circuit 510, a capacitance-exciting signal source 512 and at least one capacitance-sensing signal receiving circuit 520. The system circuit 60 comprises a system power source 600, a system ground 602 and a first specific conductor Sz1, where the touch control ground 502 and the system ground 602 are different grounds and depicted with different symbols. In the touch control circuit 50, even though not clearly labeled, the inverted-triangle symbols indicate the same ground and this is applied to the following drawings. During hovering or touch sensing operation, the capacitance-exciting signal source 512 generates an alternating signal (such as sinusoid wave signal, square wave signal, triangular wave signal or trapezoid wave signal) and the alternating signal is processed by the capacitance-exciting signal driver circuit 510 to form the capacitance-exciting signal Vs. The touch control circuit 50 sends the capacitance-exciting signal Vs to the first specific conductor Sz1 through, for example, a resistor or a capacitor. If an operation object (such as user finger or stylus) approaches or touches the hovering and touch sensing apparatus 10, for example, approaches or touches the protection layer 100 (as mentioned above, to touch the insulating protection layer 100 is equivalent to touch the touch sensing electrode layer 102 in terms of capacitance sensing), a first capacitor C1 is formed between the first specific conductor Sz1 and the operation object. According to one possible implementation, the first specific conductor Sz1 may be the static shielding protective layer 150, the shielding protective layer 204 of a display, a common electrode layer of a display (such as the common electrode layer 106 shown in FIG. 9 or FIG. 11), a metallic casing 200 or a conductive coating 200' of a casing.

Moreover, a second capacitor C2 is formed between the operation object and the respective touch sensing electrode. The capacitance-sensing signal receiving circuit 520 then receives (reads) a touch sensing signal Vc from the selected touch sensing electrode E4 (Es). The size of the first specific conductor Sz1 is generally much larger than the size of the touch sensing electrode (for example, ten times larger or much larger), the capacitance of the first capacitor C1 is much larger than the capacitance of the second capacitor C2 (for example, ten times larger or much larger). Therefore, the receiving result (for measuring the capacitance of the second capacitor C2) of the capacitance-sensing signal receiving circuit 520 is not influenced as the signal path is the first capacitor C1 in series with the operation object and the second capacitor C2. Moreover, as the first capacitor C1 has larger capacitance, the capacitance-exciting signal Vs can be more effectively sent from the first specific conductor Sz1 to the operation object, thus enhance the preciseness of the hovering or touch sensing operation.

Moreover, with reference to FIG. 1, during the hovering or touch sensing operation, there is only one physical connection point between the touch control circuit 50 and the system circuit 60, namely, a single connection point connected to the first specific conductor Sz1, and the touch control ground 502 and the system ground 602 are different grounds. Therefore, there is no common current loop between the touch control circuit 50 and the system circuit 60 during the hovering or touch sensing operation of the hovering and touch sensing apparatus 10. Moreover, the measurement of the touch control circuit 50 will not be influenced by the noise from the system circuit 60. The system power source 600 has larger capacity to supply electric power to the pixel electrode 172, the common electrode layer 106, and the thin film transistors 174 shown in FIG. 9 or the backlight unit; therefore, the system power source 600 has larger power noise. During the hovering or touch sensing operation, the noise of the system circuit 60 (including display circuit) can be prevented from coupling to the touch control circuit 50 and from influencing the sensing result of the touch control circuit 50 if there is no common current loop between the touch control circuit 50 and the system circuit 60.

Figure 2:
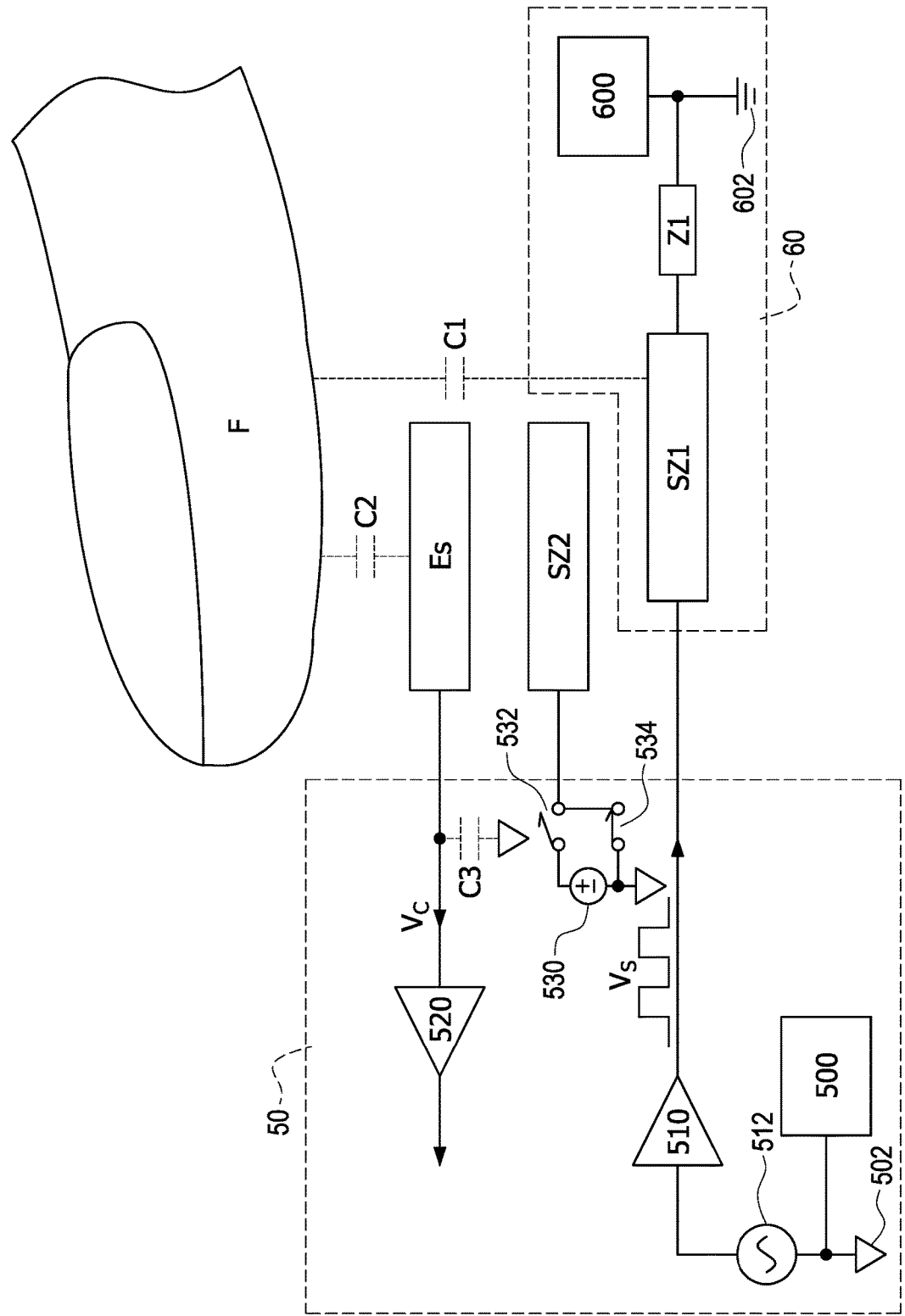
FIG. 2 shows a block diagram of the hovering and touch sensing apparatus according to another embodiment of the present invention.

FIG. 2 shows a block diagram of the hovering and touch sensing apparatus 10 according to another embodiment of the present invention. The hovering and touch sensing apparatus 10 in FIG. 2 is similar to that shown in FIG. 1; however, the hovering and touch sensing apparatus 10 in FIG. 2 further comprises a DC power source 530 and two switches 532 and 534, where the ground of the DC power source 530 is also the touch control ground 502. During hovering or touch sensing operations, the two switches 532 and 534 are operated to turn on or off such that a DC voltage is applied to a second specific conductor Sz2. The second specific conductor Sz2 is a conductor different with the first specific conductor Sz1 and structurally placed between the first specific conductor Sz1 and the touch sensing electrode layer 102. With reference also to FIG. 9, if the first specific conductor Sz1 is the metallic casing 200 or the conductive coating 200' of the casing, then the second specific conductor Sz2 may be the shielding protective layer 204 of the display or the common electrode layer (common anode or common cathode) 106 of OLED display. If the first specific conductor Sz1 is the shielding protective layer 204 of the display, then the second specific conductor Sz2 may be the common electrode layer 106 of OLED display.

With reference also to FIG. 11, if the first specific conductor Sz1 is the metallic casing 200 or the conductive coating 200' of the casing, then the second specific conductor Sz2 may be the static shielding protective layer 150 of the display or the common electrode layer 106 of LCD. If the first specific conductor Sz1 is the common electrode layer 106 of LCD, then the second specific conductor Sz2 may be the static shielding protective layer 150 of the display.

The second specific conductor Sz2 is structurally placed between the first specific conductor Sz1 and the touch sensing electrode layer 102. If a DC voltage is applied to the second specific conductor Sz2, the direct signal coupling between the first specific conductor Sz1 and the selected touch sensing electrode Es can be blocked to enhance the preciseness for hovering or touch sensing operations. According to another possible implementation of the present invention, the second specific conductor Sz2 may be electrically connected with the touch control ground 502. Namely, by turning off the switch 532 and turning on the switch 534, the second specific conductor Sz2 is electrically connected to the touch control ground 502 such that the direct signal coupling between the first specific conductor Sz1 and the selected touch sensing electrode Es can be blocked to enhance the preciseness for hovering or touch sensing operations.

Figure 3:
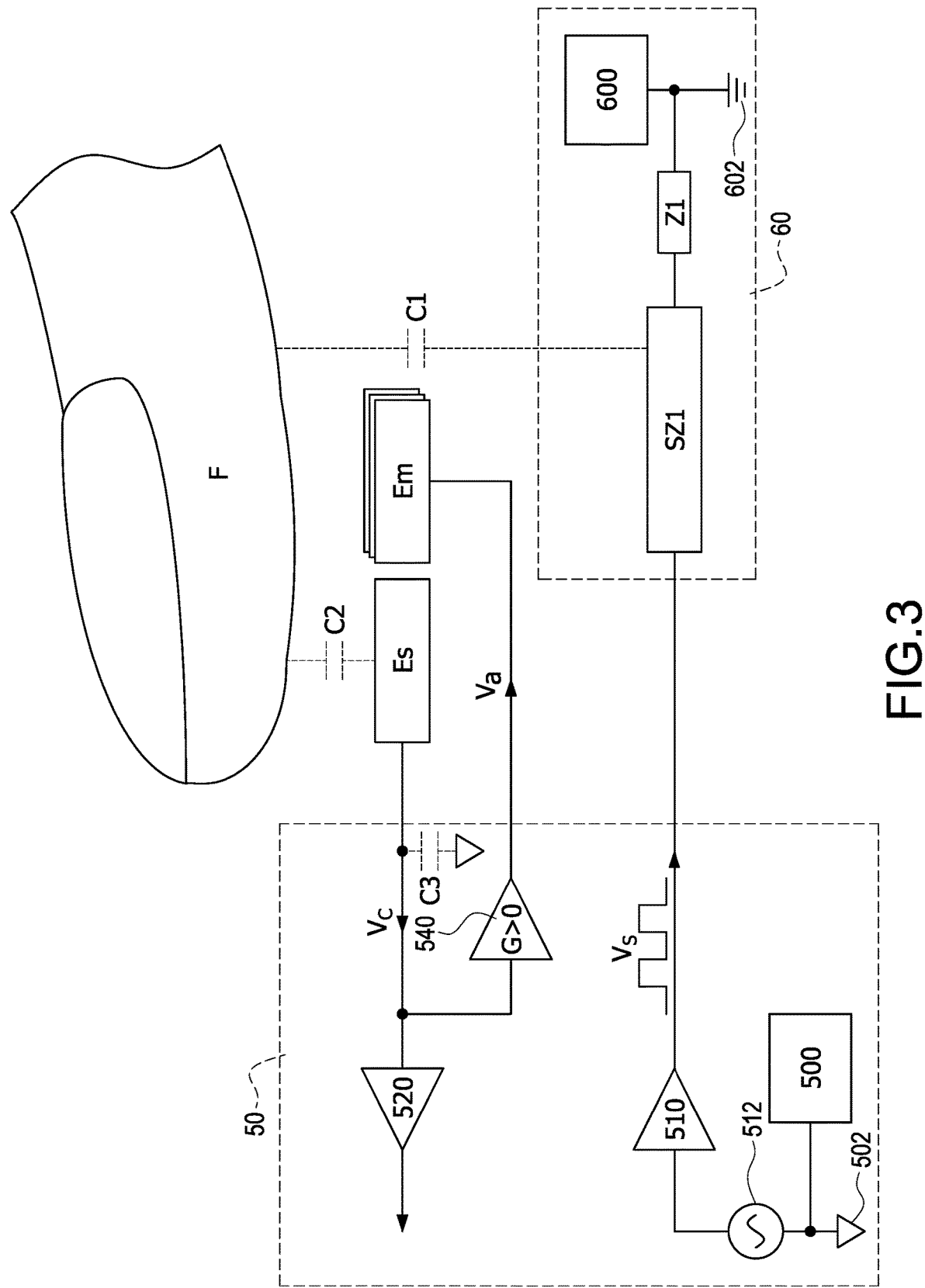
FIG. 3 shows a block diagram of the hovering and touch sensing apparatus according to still another embodiment of the present invention.

FIG. 3 shows a block diagram of the hovering and touch sensing apparatus 10 according to still another embodiment of the present invention. The hovering and touch sensing apparatus 10 in FIG. 3 is similar to that shown in FIG. 1; however, the hovering and touch sensing apparatus 10 in FIG. 3 further comprises an amplifier with gain larger than zero (namely, non-inverting amplifier) 540. The input of the amplifier 540 with gain larger than zero is coupled to the selected touch sensing electrode Es and the capacitance-sensing signal receiving circuit 520, while the output of the amplifier 540 with gain larger than zero is coupled to the surrounding touch sensing electrodes Em arranged around the selected touch sensing electrode Es. The amplifier 540 with gain larger than zero receives the touch sensing signal Vc and non-inverting amplifies the touch sensing signal Vc to form an auxiliary signal Va for preventing signal coupling. The amplifier 540 with gain larger than zero further applies the auxiliary signal Va to the surrounding touch sensing electrodes Em around the selected touch sensing electrode Es such that the coupling signal from user finger (or stylus) can be prevented from coupling to the selected touch sensing electrode Es through the surrounding touch sensing electrodes Em, thus prevent the coupling signal from influencing the measurement for the selected touch sensing electrode Es. Besides above way to apply the auxiliary signal Va, the touch control circuit 50 may send a zero-level signal or a DC signal to the surrounding touch sensing electrodes Em arranged around the selected touch sensing electrode Es. Similarly, the coupling signal from user finger (or stylus) can be prevented from coupling to the selected touch sensing electrode Es through the surrounding touch sensing electrodes Em, thus prevent the coupling signal from influencing the measurement for the selected touch sensing electrode Es. In this situation, the amplifier 540 with gain larger than zero (non-inverting amplifier 540) can be replaced by an amplifier with gain equal to zero to provide the zero-level signal.

Figure 4:
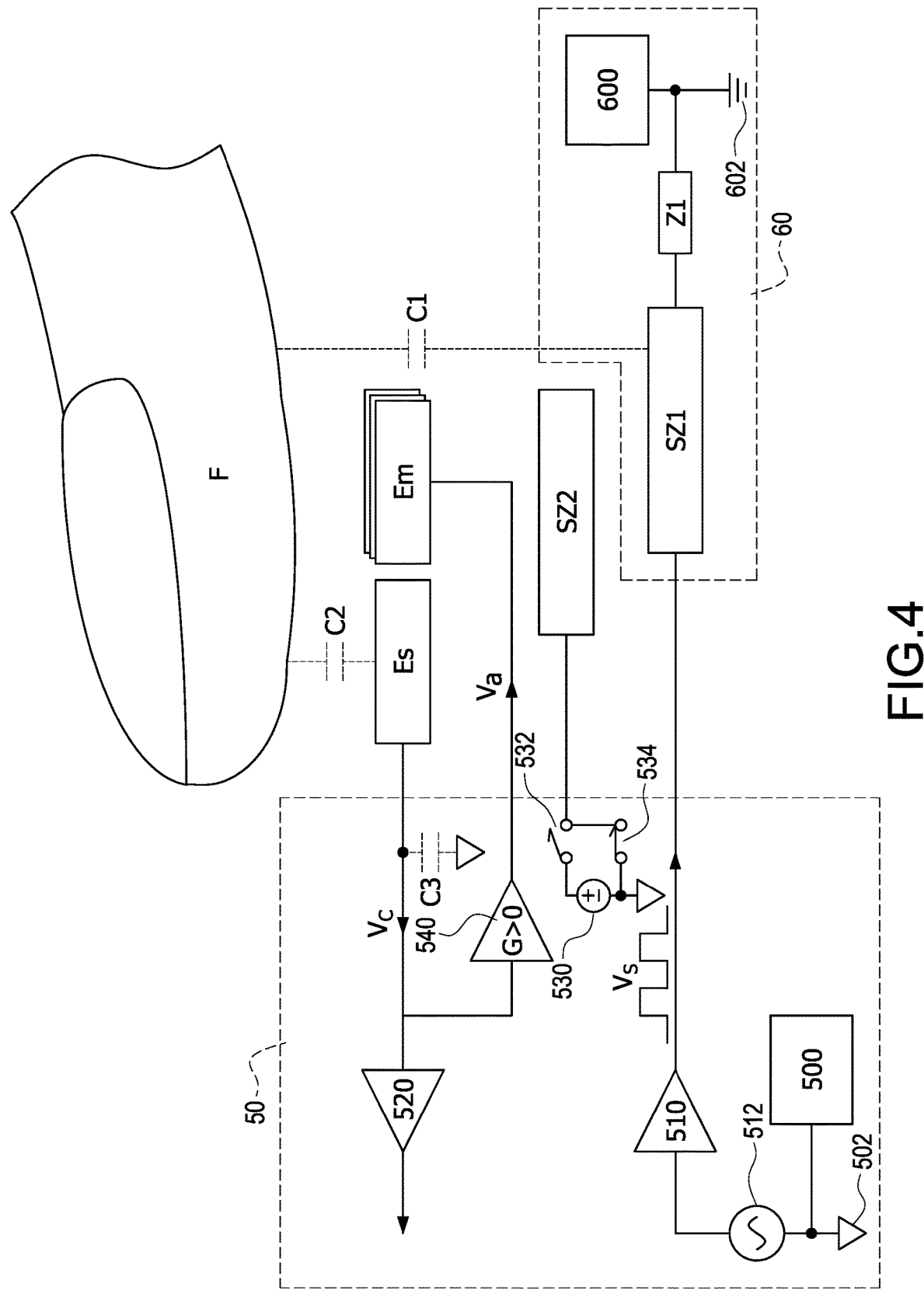
FIG. 4 shows a block diagram of the hovering and touch sensing apparatus according to still another embodiment of the present invention.

FIG. 4 shows a block diagram of the hovering and touch sensing apparatus 10 according to still another embodiment of the present invention. The hovering and touch sensing apparatus 10 in FIG. 4 is similar to that shown in FIG. 2; however, the hovering and touch sensing apparatus 10 in FIG. 4 further comprises an amplifier with gain larger than zero (namely, non-inverting amplifier) 540 in comparison with the embodiment shown in FIG. 2. Similarly, the input of the amplifier 540 with gain larger than zero is coupled to the selected touch sensing electrode Es and the capacitance-sensing signal receiving circuit 520, while the output of the amplifier 540 with gain larger than zero is coupled to the surrounding touch sensing electrodes Em arranged around the selected touch sensing electrode Es. When the hovering and touch sensing apparatus 10 performs hovering or touch sensing operations, the capacitance-exciting signal source 512 of the touch control circuit 50 generates an alternating signal and the alternating signal is processed by the capacitance-exciting signal driver circuit 510 to form the capacitance-exciting signal Vs. The touch control circuit 50 sends the capacitance-exciting signal Vs to the first specific conductor Sz1 such that a first capacitor C1 is formed between the first specific conductor Sz1 and the operation object. Moreover, a second capacitor 2 is formed between the operation object and the respective touch sensing electrode. The capacitance-sensing signal receiving circuit 520 then receives (reads) a touch sensing signal Vc from the selected touch sensing electrode Es. At this time, the DC power source 530 supplies a DC voltage to the second specific conductor Sz2. The second specific conductor Sz2 is a conductor different with the first specific conductor Sz1 and structurally placed between the first specific conductor Sz1 and the touch sensing electrode layer 102. The direct signal coupling between the first specific conductor Sz1 and the selected touch sensing electrode Es can be blocked to enhance the preciseness for hovering or touch sensing operations. The amplifier 540 with gain larger than zero receives the touch sensing signal Vc and non-inverting amplifies the touch sensing signal Vc to form an auxiliary signal Va for preventing signal coupling. The amplifier 540 with gain larger than zero further applies the auxiliary signal Va to the surrounding touch sensing electrodes Em arranged around the selected touch sensing electrode Es such that the coupling signal from user finger (or stylus) can be prevented from coupling to the selected touch sensing electrode Es through the surrounding touch sensing electrodes Em, thus prevent the coupling signal from influencing the measurement for the selected touch sensing electrode Es. Besides above way to applying the auxiliary signal Va, the touch control circuit 50 may send a zero-level signal or a DC signal to the surrounding touch sensing electrodes Em arranged around the selected touch sensing electrode Es. Similarly, the coupling signal from user finger (or stylus) can be prevented from coupling to the selected touch sensing electrode Es through the surrounding touch sensing electrodes Em, thus prevent the coupling signal from influencing the measurement for the selected touch sensing electrode Es.

Similarly, in the embodiments shown in FIGS. 2 to 4, during hovering or touch sensing operations, there is only one physical connection point between the touch control circuit 50 and the system circuit 60, namely, a single connection point connected to the first specific conductor Sz1, and the touch control ground 502 and the system ground 602 are different grounds. Therefore, there is no common current loop between the touch control circuit 50 and the system circuit 60 during the hovering or touch sensing operation of the hovering and touch sensing apparatus 10. Moreover, the measurement of the touch control circuit 50 will not be influenced by the noise from the system circuit 60. Besides, a ground impedance Z1 is present between the first specific conductor Sz1 and the system ground 602, and the ground impedance Z1 is for example, an impedance smaller than one hundred thousand of ohms or a zero-ohm impedance.

Figure 5A:
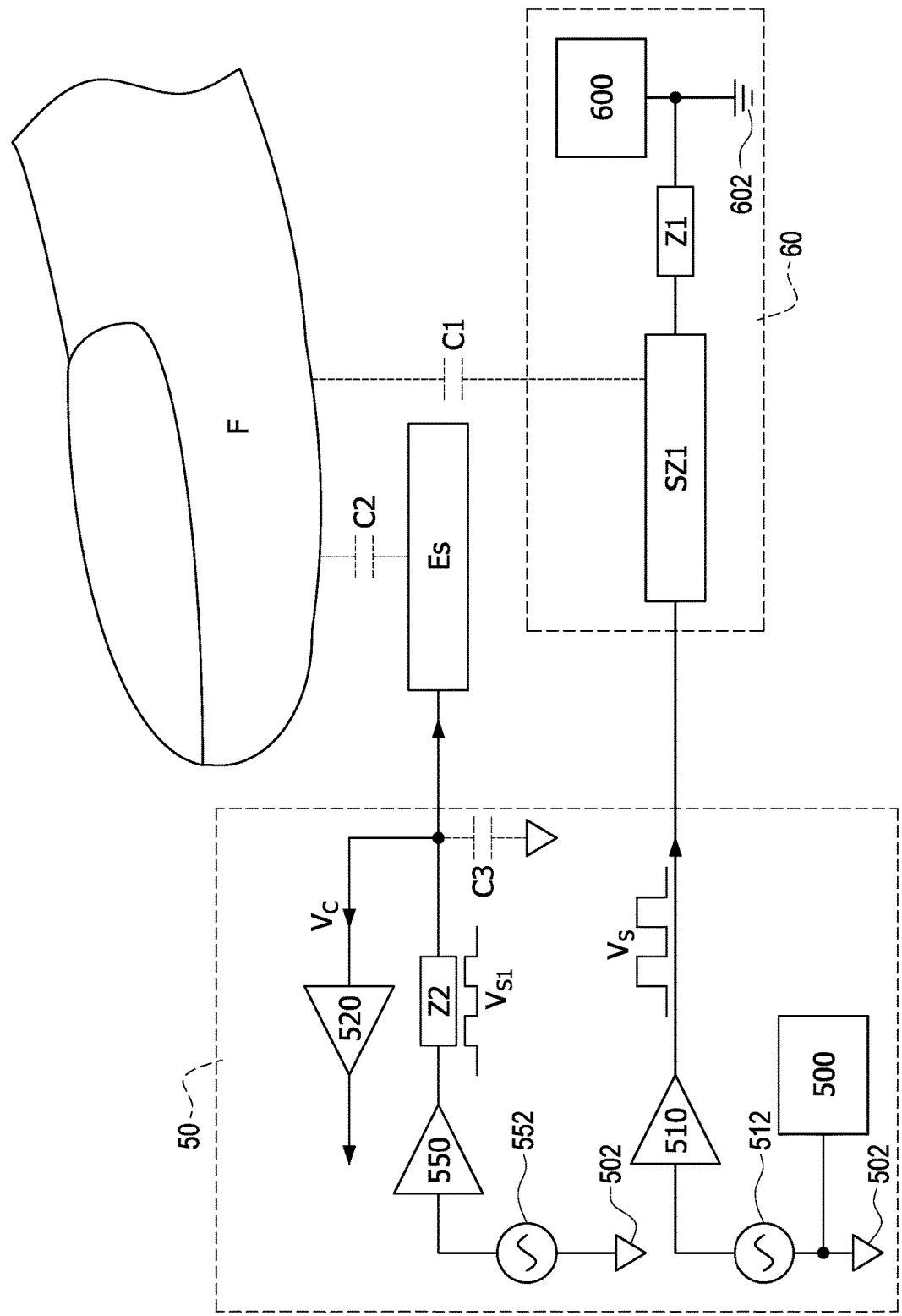
FIG. 5A shows a block diagram of the hovering and touch sensing apparatus according to still another embodiment of the present invention.

FIG. 5A shows a block diagram of the hovering and touch sensing apparatus 10 according to still another embodiment of the present invention. Similarly, the sectional view of the hovering and touch sensing apparatus 10 shown in FIG. 5A can be referred to that shown in FIG. 9, while the distribution of the touch sensing electrodes can be referred to those shown in FIGS. 10A and 10B. As shown in FIG. 5A, the hovering and touch sensing apparatus 10 of the present invention further comprises a touch control circuit 50 and a system circuit 60. The touch control circuit 50 comprises a touch control power source 500, a touch control ground 502, a capacitance-exciting signal driver circuit 510, a capacitance-exciting signal source 512 and at least one capacitance-sensing signal receiving circuit 520. The system circuit 60 comprises a system power source 600, a system ground 602 and a first specific conductor Sz1, where the touch control ground 502 and the system ground 602 are different grounds and depicted with different symbols. Besides, the touch control circuit 50 further comprises an auxiliary capacitance-exciting signal source 552 connected to the touch control ground 502 and an auxiliary capacitance-exciting signal driver circuit 550.

During hovering or touch sensing operation, the capacitance-exciting signal source 512 generates an alternating signal (such as sinusoid wave signal, square wave signal, triangular wave signal or trapezoid wave signal) and the alternating signal is processed by the capacitance-exciting signal driver circuit 510 to form the capacitance-exciting signal Vs. The touch control circuit 50 sends the capacitance-exciting signal Vs to the first specific conductor Sz1 through, for example, a resistor or a capacitor. If an operation object (such as user finger or stylus) approaches or touches the hovering and touch sensing apparatus 10, for example, approaches or touches the insulating protection layer 100, a first capacitor C1 is formed between the first specific conductor Sz1 and the operation object. According to one possible implementation, the first specific conductor Sz1 may be the static shielding protective layer 150, the shielding protective layer 204 of a display, a common electrode layer of a display (such as the common electrode layer 106 shown in FIG. 9 or FIG. 11), a metallic casing 200 or a conductive coating 200' of a casing.

At the same time, the auxiliary capacitance-exciting signal source 552 generates another alternating signal and the auxiliary capacitance-exciting signal driver circuit 550 processes above-mentioned another alternating signal into an auxiliary capacitance-exciting signal Vs1. The auxiliary capacitance-exciting signal driver circuit 550 sends the auxiliary capacitance-exciting signal Vs1, through an impedance Z2, to the selected touch sensing electrode Es. The impedance Z2 is for example, a resistor, a capacitor or a conductive wire. A second capacitor C2 is formed between the operation object and the respective touch sensing electrode. The capacitance-sensing signal receiving circuit 520 then receives (reads) a touch sensing signal Vc from the selected touch sensing electrode E4 (Es). The size of the first specific conductor Sz1 is generally much larger than the size of the touch sensing electrode (for example, ten times larger or much larger), the capacitance of the first capacitor C1 is much larger than the capacitance of the second capacitor C2 (for example, ten times larger or much larger). Therefore, the receiving result (for measuring the capacitance of the second capacitor C2) of the capacitance-sensing signal receiving circuit 520 is not influenced as the signal path is the first capacitor C1 in series with the operation object and the second capacitor C2. Moreover, as the first capacitor C1 has larger capacitance, the capacitance-exciting signal Vs can be more effectively sent from the first specific conductor Sz1 to the operation object. Besides, the auxiliary capacitance-exciting signal driver circuit 550 applies the auxiliary capacitance-exciting signal Vs1 to the selected touch sensing electrode E4 (Es) to further enhance the preciseness of the hovering or touch sensing operation. In this embodiment, the auxiliary capacitance-exciting signal Vs1 may have the same phase or opposite phase with the capacitance-exciting signal Vs; the frequency of the auxiliary capacitance-exciting signal Vs1 may be the same or different with the frequency of the capacitance-exciting signal Vs; the amplitude of the auxiliary capacitance-exciting signal Vs1 may be the same or different with the amplitude of the capacitance-exciting signal Vs. According to one possible implementation, the frequency of the auxiliary capacitance-exciting signal Vs1 is smaller than the frequency of the capacitance-exciting signal Vs. According to another possible implementation, the amplitude of the auxiliary capacitance-exciting signal Vs1 is smaller than the amplitude of the capacitance-exciting signal Vs. According to still another possible implementation, the phase of the auxiliary capacitance-exciting signal Vs1 is opposite to the phase of the capacitance-exciting signal Vs.

Moreover, with reference to FIG. 5A, during the hovering or touch sensing operation, there is only one physical connection point between the touch control circuit 50 and the system circuit 60, namely, a single connection point connected to the first specific conductor Sz1, and the touch control ground 502 and the system ground 602 are different grounds. Therefore, there is no common current loop between the touch control circuit 50 and the system circuit 60 during the hovering or touch sensing operation of the hovering and touch sensing apparatus 10. Moreover, the measurement of the touch control circuit 50 will not be influenced by the noise from the system circuit 60. The system power source 600 has larger capacity to supply electric power to the pixel electrode 172, the common electrode layer 106, and the thin film transistors 174 shown in FIG. 9 or the backlight unit; therefore, the system power source 600 has larger power noise. During the hovering or touch sensing operation, the noise of the system circuit 60 (including display circuit) can be prevented from coupling to the touch control circuit 50 and from influencing the sensing result of the touch control circuit 50 if there is no common current loop between the touch control circuit 50 and the system circuit 60.

Figure 5B:
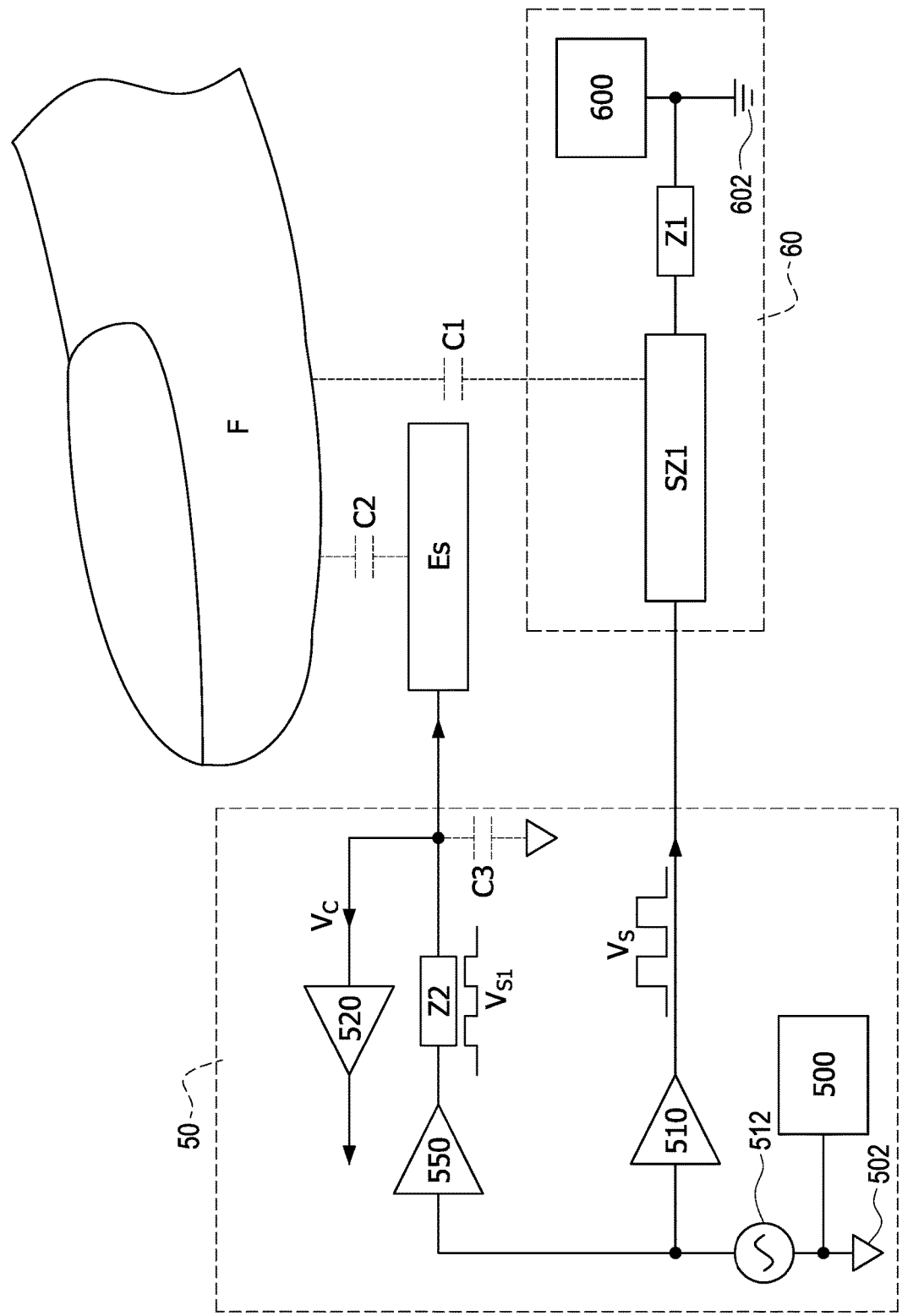
FIG. 5B shows a block diagram of the hovering and touch sensing apparatus according to still another embodiment of the present invention.

FIG. 5B shows a block diagram of the hovering and touch sensing apparatus 10 according to still another embodiment of the present invention. The embodiment shown in FIG. 5B is similar to that shown in FIG. 5A, but the embodiment shown in FIG. 5B can be dispensed with the auxiliary capacitance-exciting signal source 552, namely, the auxiliary capacitance-exciting signal source 552 is removed in this embodiment. Besides, the input of the auxiliary capacitance-exciting signal driver circuit 550 is coupled to the output of the capacitance-exciting signal source 512 to process the output of the capacitance-exciting signal source 512 into the auxiliary capacitance-exciting signal Vs1. In this embodiment, the frequency of the auxiliary capacitance-exciting signal Vs1 is the same with the frequency of the capacitance-exciting signal Vs; but the amplitude and/or phase of the auxiliary capacitance-exciting signal Vs1 may be the same or different with the amplitude and/or phase of the capacitance-exciting signal Vs. According to a possible implementation, the amplitude of the auxiliary capacitance-exciting signal Vs1 is smaller than the amplitude of the capacitance-exciting signal Vs. According to another possible implementation, the phase of the auxiliary capacitance-exciting signal Vs1 is opposite to the phase of the capacitance-exciting signal Vs. Namely, the auxiliary capacitance-exciting signal driver circuit 550 is an inverting amplifier. Similarly, the auxiliary capacitance-exciting signal driver circuit 550 applies the auxiliary capacitance-exciting signal Vs1 to the selected touch sensing electrode E4 (Es) to further enhance the preciseness of the hovering or touch sensing operation.

Figure 6:
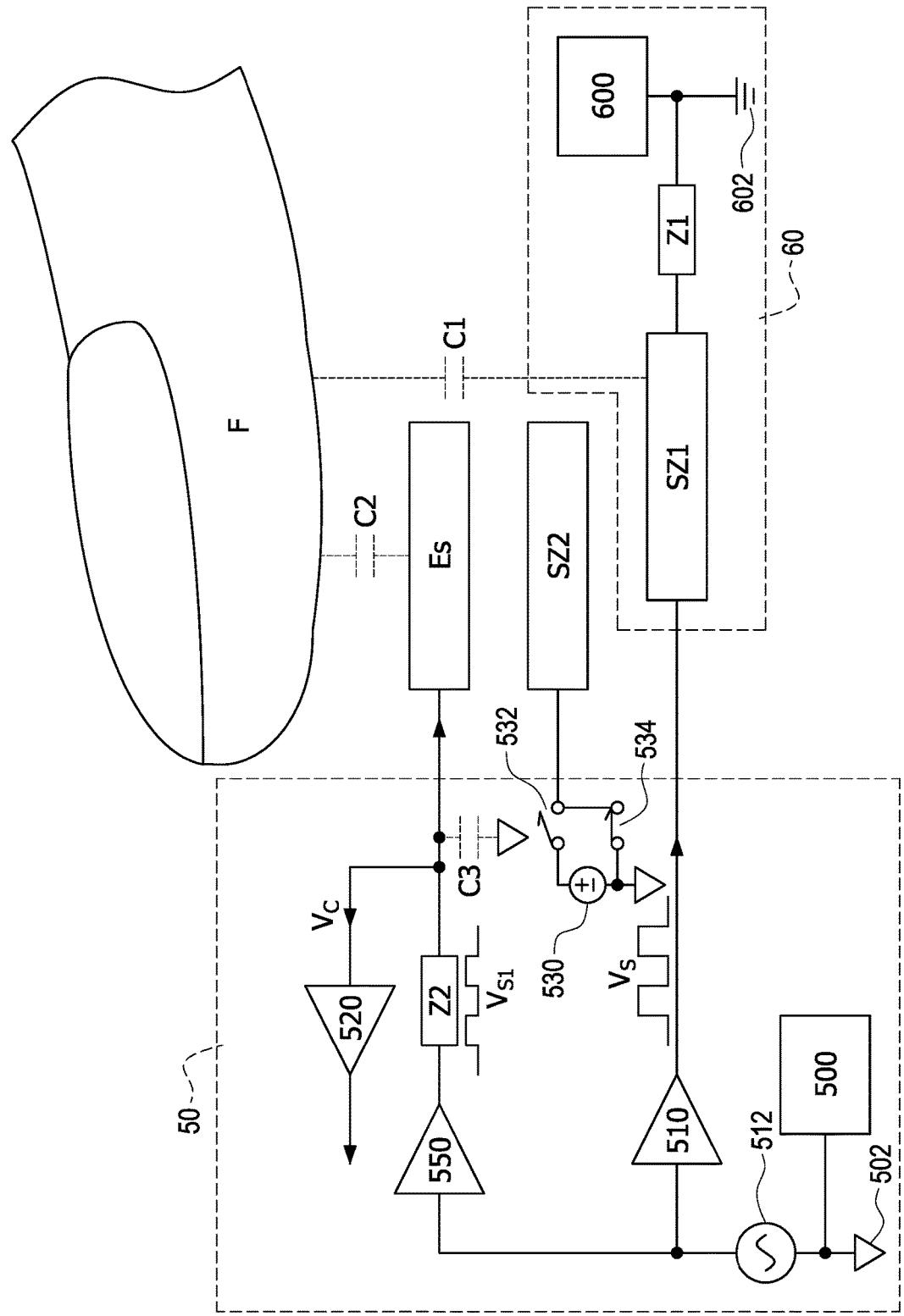
FIG. 6 shows a block diagram of the hovering and touch sensing apparatus according to still another embodiment of the present invention.

FIG. 6 shows a block diagram of the hovering and touch sensing apparatus 10 according to another embodiment of the present invention. The hovering and touch sensing apparatus 10 in FIG. 6 is similar to that shown in FIG. 5B; however, the hovering and touch sensing apparatus 10 in FIG. 6 further comprises a DC power source 530 and two switches 532 and 534, where the ground of the DC power source 530 is also the touch control ground 502. During hovering or touch sensing operations, the two switches 532 and 534 are operated to turn on or off such that a DC voltage is applied to a second specific conductor Sz2. The second specific conductor Sz2 is a conductor different with the first specific conductor Sz1 and structurally placed between the first specific conductor Sz1 and the touch sensing electrode layer 102. With reference also to FIG. 9, if the first specific conductor Sz1 is the metallic casing 200 or the conductive coating 200' of the casing, then the second specific conductor Sz2 may be the shielding protective layer 204 of the display or the common electrode layer (common anode or common cathode) 106 of OLED display. If the first specific conductor Sz1 is the shielding protective layer 204 of the display, then the second specific conductor Sz2 may be the common electrode layer 106 of OLED display. With reference also to FIG. 11, if the first specific conductor Sz1 is the metallic casing 200 or the conductive coating 200' of the casing, then the second specific conductor Sz2 may be the static shielding protective layer 150 of the display or the common electrode layer 106 of LCD. If the first specific conductor Sz1 is the common electrode layer 106 of LCD, then the second specific conductor Sz2 may be the static shielding protective layer 150 of the display. The second specific conductor Sz2 is structurally placed between the first specific conductor Sz1 and the touch sensing electrode layer 102. If a DC voltage is applied to the second specific conductor Sz2, the direct signal coupling between the first specific conductor Sz1 and the selected touch sensing electrode Es can be blocked to enhance the preciseness for hovering or touch sensing operations. According to another possible implementation of the present invention, the second specific conductor Sz2 may be electrically connected with the touch control ground 502. Namely, by cutting off the switch 532 and conducting the switch 534, the second specific conductor Sz2 is electrically connected to the touch control ground 502 such that the direct signal coupling between the first specific conductor Sz1 and the selected touch sensing electrode Es can be blocked to enhance the preciseness for hovering or touch sensing operations.

Figure 7:
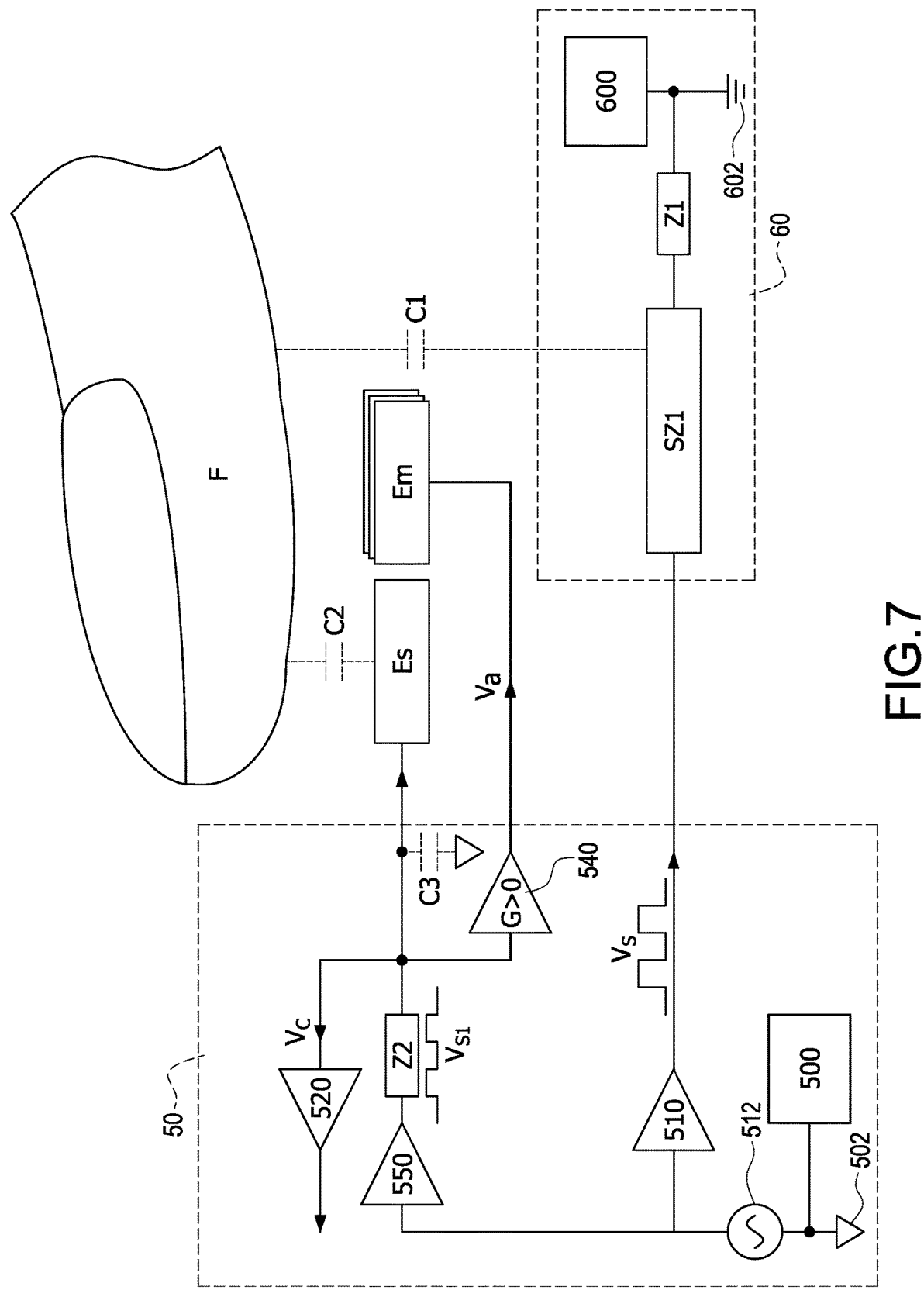
FIG. 7 shows a block diagram of the hovering and touch sensing apparatus according to still another embodiment of the present invention.

FIG. 7 shows a block diagram of the hovering and touch sensing apparatus 10 according to still another embodiment of the present invention. The hovering and touch sensing apparatus 10 in FIG. 7 is similar to that shown in FIG. 5B; however, the hovering and touch sensing apparatus 10 in FIG. 7 further comprises an amplifier with gain larger than zero (namely, non-inverting amplifier) 540. The input of the amplifier 540 with gain larger than zero is coupled to the selected touch sensing electrode Es and the capacitance-sensing signal receiving circuit 520, while the output of the amplifier 540 with gain larger than zero is coupled to the surrounding touch sensing electrodes Em arranged around the selected touch sensing electrode Es. The amplifier 540 with gain larger than zero receives the touch sensing signal Vc and non-inverting amplifies the touch sensing signal Vc to form an auxiliary signal Va for preventing signal coupling. The amplifier 540 with gain larger than zero further applies the auxiliary signal Va to the surrounding touch sensing electrodes Em arranged around the selected touch sensing electrode Es such that the coupling signal from user finger (or stylus) can be prevented from coupling to the selected touch sensing electrode Es through the surrounding touch sensing electrodes Em (which are not the target for measurement), thus prevent the coupling signal from influencing the measurement for the selected touch sensing electrode Es. Besides above way to apply the auxiliary signal Va, the touch control circuit 50 may send a zero-level signal or a DC signal to the surrounding touch sensing electrodes Em arranged around the selected touch sensing electrode Es. Similarly, the coupling signal from user finger (or stylus) can be prevented from coupling to the selected touch sensing electrode Es through the surrounding touch sensing electrodes Em, thus prevent the coupling signal from influencing the measurement for the selected touch sensing electrode Es. In this situation, the amplifier 540 with gain larger than zero (non-inverting amplifier 540) can be replaced by an amplifier with gain equal to zero to provide the zero-level signal.

Figure 8:
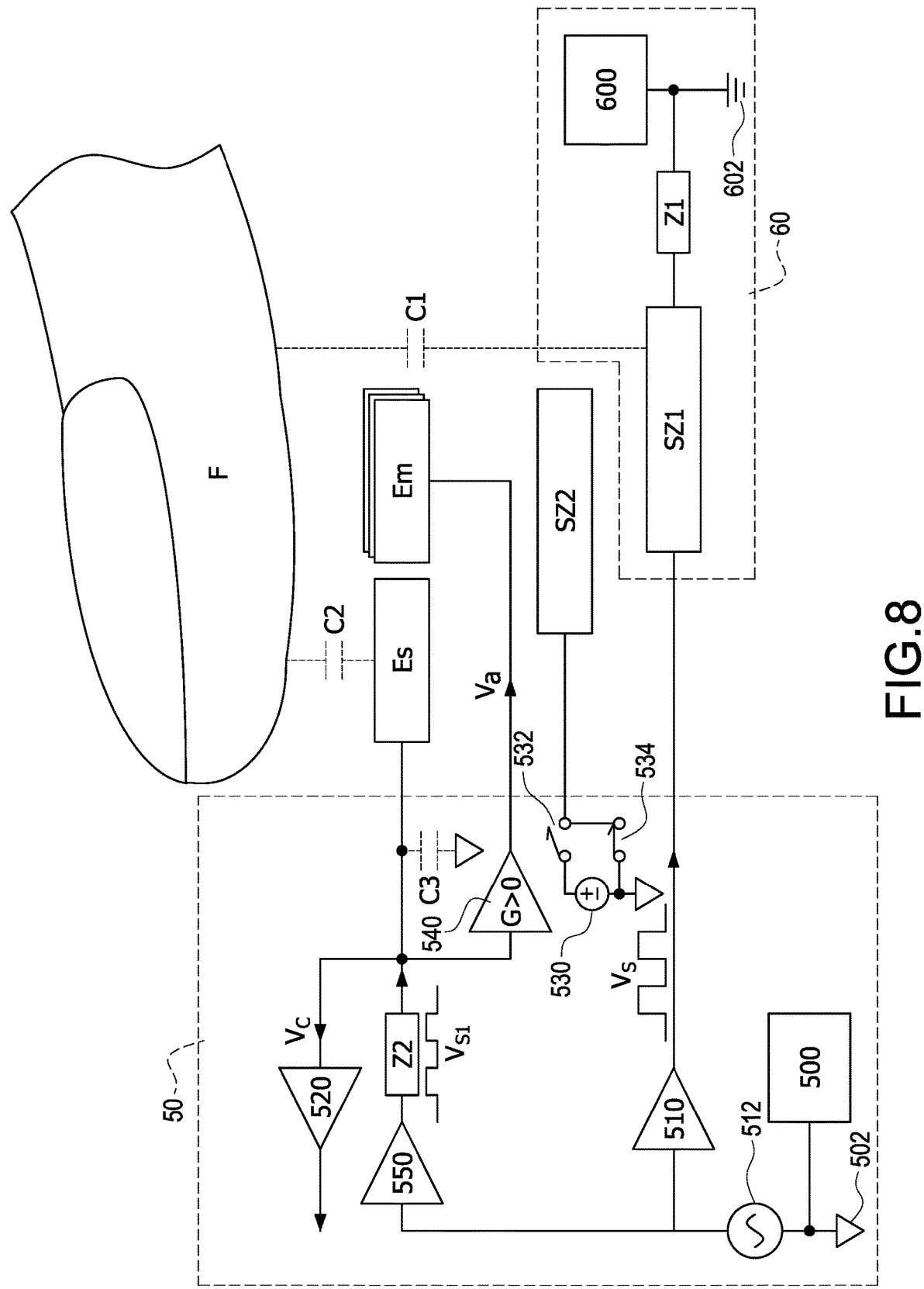
FIG. 8 shows a block diagram of the hovering and touch sensing apparatus according to still another embodiment of the present invention.

FIG. 8 shows a block diagram of the hovering and touch sensing apparatus 10 according to still another embodiment of the present invention. The hovering and touch sensing apparatus 10 in FIG. 8 is similar to that shown in FIG. 6; however, the hovering and touch sensing apparatus 10 in FIG. 8 further comprises an amplifier with gain larger than zero (namely, non-inverting amplifier) 540 in comparison with the embodiment shown in FIG. 6. Similarly, the input of the amplifier 540 with gain larger than zero is coupled to the selected touch sensing electrode Es and the capacitance-sensing signal receiving circuit 520, while the output of the amplifier 540 with gain larger than zero is coupled to the surrounding touch sensing electrodes Em arranged around the selected touch sensing electrode Es. When the hovering and touch sensing apparatus 10 performs hovering or touch sensing operations, the capacitance-exciting signal source 512 of the touch control circuit 50 generates an alternating signal and the alternating signal is processed by the capacitance-exciting signal driver circuit 510 to form the capacitance-exciting signal Vs. The touch control circuit 50 sends the capacitance-exciting signal Vs to the first specific conductor Sz1 such that a first capacitor C1 is formed between the first specific conductor Sz1 and the operation object. Moreover, a second capacitor 2 is formed between the operation object and the respective touch sensing electrode. The capacitance-sensing signal receiving circuit 520 then receives (reads) a touch sensing signal Vc from the selected touch sensing electrode Es. At this time, the DC power source 530 supplies a DC voltage to the second specific conductor Sz2. The second specific conductor Sz2 is a conductor different with the first specific conductor Sz1 and structurally placed between the first specific conductor Sz1 and the touch sensing electrode layer 102. The direct signal coupling between the first specific conductor Sz1 and the selected touch sensing electrode Es can be blocked to enhance the preciseness for hovering or touch sensing operations. The amplifier 540 with gain larger than zero receives the touch sensing signal Vc and non-inverting amplifies the touch sensing signal Vc to form an auxiliary signal Va for preventing signal coupling. The amplifier 540 with gain larger than zero further applies the auxiliary signal Va to the surrounding touch sensing electrodes Em arranged around the selected touch sensing electrode Es such that the coupling signal from user finger (or stylus) can be prevented from coupling to the selected touch sensing electrode Es through the surrounding touch sensing electrodes Em, thus prevent the coupling signal from influencing the measurement for the selected touch sensing electrode Es.

In the embodiments shown in FIGS. 6-8, they are similar to that shown in FIG. 5B, namely only the capacitance-exciting signal source 512 is present (in other words, the auxiliary capacitance-exciting signal Vs1 is output by the capacitance-exciting signal source 512 after processing). However, similar to the embodiment shown in FIG. 5A, the embodiments shown in FIGS. 6-8 can be adapted to have additional auxiliary capacitance-exciting signal source 552 to generate another alternating signal and the auxiliary capacitance-exciting signal driver circuit 550 processes the another alternating signal to provide the auxiliary capacitance-exciting signal Vs1. If the embodiments shown in FIGS. 6-8 use additional auxiliary capacitance-exciting signal source 552 to provide the auxiliary capacitance-exciting signal Vs1, the auxiliary capacitance-exciting signal Vs1 may have the same phase or opposite phase with the capacitance-exciting signal Vs; the frequency of the auxiliary capacitance-exciting signal Vs1 may be the same or different with the frequency of the capacitance-exciting signal Vs; the amplitude of the auxiliary capacitance-exciting signal Vs1 may be the same or different with the amplitude of the capacitance-exciting signal Vs. According to one possible implementation, the frequency of the auxiliary capacitance-exciting signal Vs1 is smaller than the frequency of the capacitance-exciting signal Vs. According to another possible implementation, the amplitude of the auxiliary capacitance-exciting signal Vs1 is smaller than the amplitude of the capacitance-exciting signal Vs. According to still another possible implementation, the phase of the auxiliary capacitance-exciting signal Vs1 is opposite to the phase of the capacitance-exciting signal Vs.

Besides, in the embodiments shown in FIGS. 5B, 6~8, during the hovering or touch sensing operation, there is only one physical connection point between the touch control circuit 50 and the system circuit 60, namely, a single connection point connected to the first specific conductor Sz1, and the touch control ground 502 and the system ground 602 are different grounds. Therefore, there is not common current loop between the touch control circuit 50 and the system circuit 60 during the hovering or touch sensing operation of the hovering and touch sensing apparatus 10. Moreover, the measurement of the touch control circuit 50 will not be influenced by the noise from the system circuit 60. Besides, a ground impedance Z1 is present between the first specific conductor Sz1 and the system ground 602, and the ground impedance Z1 is for example, an impedance smaller than one hundred thousand of ohms or zero-ohm impedance.

FIG. 12A shows a layered structure of the hovering and touch sensing apparatus 10 according to an embodiment of the present invention. The hovering and touch sensing apparatus 10 shown in this embodiment comprises a touch display panel formed by attaching a touch control panel 300 to a display 400 and arranging the touch display panel on a casing 200. The display 400 may be a liquid crystal display or an OLED display. FIGS. 12B, 12C and 12D respectively show the layered structures for the touch control panel 300 according to different embodiments of the present invention. As shown in FIG. 12B, the touch control panel 300 comprises, from top to down, a protection layer 100 and a touch sensing electrode layer 102. The protection layer 100 is a glass substrate or a polymer substrate, and the touch sensing electrode layer 102 comprises a plurality of transparent conductive electrodes. With reference also to FIGS. 9 and 11, the uppermost two layers shown in these two figures can be the structure shown in FIG. 12B. In other possible implementations, the uppermost two layers shown in the embodiments of FIGS. 9 and 11 can be replaced by the touch control panel 300 shown in FIGS. 12C and 12D. The touch control panel 300 shown in FIG. 12C comprises, from top to down, a protection layer 100, a touch sensing electrode layer 102 (which can be deemed as the first transparent conductive layer), a first insulating layer 1031, and a second transparent conductive layer 1051.

The touch control panel 300 shown in FIG. 12D comprises, from top to down, a protection layer 100, a touch sensing electrode layer 102 (which can be deemed as the first transparent conductive layer), a first insulating layer 1031, and a second transparent conductive layer 1051, a second insulating layer 1032 and a third transparent conductive layer 1052.

With reference to FIGS. 1, 3, 5A, 5B and 7, when the uppermost two layers of the hovering and touch sensing apparatus 10 shown in FIGS. 9 and 11 are replaced by the touch control panel 300 shown in FIG. 12C, the first specific conductor Sz1 can be the second transparent conductive layer 1051 shown in FIG. 11C.

With reference to FIGS. 2, 4, 6 and 8, when the uppermost two layers of the hovering and touch sensing apparatus 10 shown in FIG. 9 are replaced by the touch control panel 300 shown in FIG. 12C, the second specific conductor Sz2 can be the second transparent conductive layer 1051 while the first specific conductor Sz1 can be the common electrode layer 106, the metallic casing 200 or the conductive coating 200' of a casing.

When the uppermost two layers of the hovering and touch sensing apparatus 10 shown in FIG. 11 are replaced by the touch control panel 300 shown in FIG. 12C, the second specific conductor Sz2 can be the second transparent conductive layer 1051 while the first specific conductor Sz1 can be the static shielding protective layer 150, the common electrode layer 106, the metallic casing 200 or the conductive coating 200' of a casing.

With reference to FIGS. 2, 4, 6 and 8, when the uppermost two layers of the hovering and touch sensing apparatus 10 shown in FIGS. 9 and 11 are replaced by the touch control panel 300 shown in FIG. 12D, the second specific conductor Sz2 can be the second transparent conductive layer 1051 while the first specific conductor Sz1 can be the third transparent conductive layer 1052.

In above mentioned embodiments, the plurality of touch sensing electrodes and the second specific conductor Sz2 can be made from transparent conductive material. The capacitance-sensing signal receiving circuit 520 can be self-capacitance sensing circuit.

To sum up, the hovering and touch sensing apparatus of the present invention has at least following advantages:

1. During hovering or touch sensing operation, the hovering and touch sensing apparatus applies an alternating signal, which is driven by the capacitance-exciting signal driver circuit, to the first specific conductor. The first specific conductor is, for example, a metallic casing, a conductive coating of a casing, a static shielding protective layer, a shielding protective layer, or a common electrode layer of a display, thus more effectively apply the capacitance-exciting signal to the operation object.

2. During hovering or touch sensing operation, there is only one physical connection point between the touch control circuit 50 and the system circuit 60, and the touch control ground 502 and the system ground 602 are different grounds. Therefore, there is no common current loop between the touch control circuit 50 and the system circuit 60 during the hovering or touch sensing operation of the hovering and touch sensing apparatus 10. Moreover, the measurement of the touch control circuit 50 will not be influenced by the noise from the system circuit 60.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A hovering and touch sensing apparatus, comprising
a touch sensing electrode matrix comprising a plurality of touch sensing electrodes, a system circuit and a touch control circuit;
the system circuit comprising: a system power source; a system ground; a first specific conductor with area larger than any area of the touch sensing electrodes, the first specific conductor electrically connected to the system power source and the system ground;
the touch control circuit comprising: a touch control power source; a touch control ground; a capacitance-exciting signal source; a capacitance-exciting signal driver circuit; and at least one capacitance-sensing signal receiving circuit, wherein the touch control power source is electrically connected to the touch control ground and supplies electric power to the capacitance-exciting signal source, the capacitance-exciting signal driver circuit, and the at least one capacitance-sensing signal receiving circuit,
wherein when an operation object approaches or touches the plurality of touch sensing electrodes for hovering or touch sensing operation, the system circuit is electrically connected to the touch control circuit only through the firsts specific conductor such that there is no common current loop between the system power source and the touch control power source; the capacitance-exciting signal source generates an alternating signal; the capacitance-exciting signal driver circuit processes the alternating signal and then electrically coupled the processed alternating signal to the first specific conductor,
wherein a first capacitor is formed between the operation object and the first specific conductor, a second capacitor is formed between the operation object and the respective one of the touch sensing electrodes, the at least one capacitance-sensing signal receiving circuit receives a touch sensing signal from a selected touch sensing electrode;
wherein the capacitance exciting signal driver circuit is arranged within the touch control circuit.

2. The hovering and touch sensing apparatus in claim 1, where a ground impedance with resistance less than one hundred thousand ohms is arranged between the first specific conductor and the system ground.

3. The hovering and touch sensing apparatus in claim 1, wherein the alternating signal generated by the capacitance-exciting signal source is a sinusoid wave signal, a square wave signal, a triangular wave signal or a trapezoid wave signal.

4. The hovering and touch sensing apparatus in claim 1, wherein a capacitance of the first capacitor is larger than a capacitance of the second capacitor during hovering or touch sensing operation.

5. The hovering and touch sensing apparatus in claim 1, further comprising an amplifier with gain larger than zero, wherein the amplifier with gain larger than zero processes the touch sensing signal into an auxiliary signal and applies the auxiliary signal to a plurality of touch sensing electrodes arranged around the selected touch sensing electrode.

6. The hovering and touch sensing apparatus in claim 1, wherein the touch control circuit further applies a zero level signal or a DC signal to a plurality of touch sensing electrodes arranged around the selected touch sensing electrode.

7. The hovering and touch sensing apparatus in claim 1, wherein the system circuit comprises a display driver and the first specific conductor is a static shielding protective layer or a shielding protective layer of a display.

8. The hovering and touch sensing apparatus in claim 1, wherein the system circuit comprises a display driver and the first specific conductor is a common electrode layer of a display.

9. The hovering and touch sensing apparatus in claim 1, wherein the first specific conductor is a metallic casing or a conductive coating of a casing.

10. The hovering and touch sensing apparatus in claim 1, further comprising a second specific conductor arranged between the first specific conductor and the touch sensing electrode matrix.

11. The hovering and touch sensing apparatus in claim 10, wherein the second specific conductor is electrically connected to the touch control ground during hovering or touch sensing operation.

12. The hovering and touch sensing apparatus in claim 10, wherein the touch control circuit applies a DC voltage to the second specific conductor during hovering or touch sensing operation.

13. The hovering and touch sensing apparatus in claim 10, wherein the plurality of touch sensing electrodes and the second specific conductor are made from transparent conductive material.

* * * * *